United States Patent [19]

de Mey, II

[11] 4,282,897

[45] Aug. 11, 1981

[54] VALVE ASSEMBLY FOR PRESSURIZED FLUID SYSTEMS

[75] Inventor: Charles F. de Mey, II, West Redding, Conn.

[73] Assignee: The Perkin-Elmer Corporation, Norwalk, Conn.

[21] Appl. No.: 42,759

[22] Filed: May 29, 1979

[51] Int. Cl.³ ............................................. F16K 15/04
[52] U.S. Cl. .............................. 137/515.7; 137/512; 137/533.11; 251/368
[58] Field of Search ............... 137/512, 519.5, 515.7, 137/533.11, 533.13, 533.15, 539; 251/368

[56] References Cited

U.S. PATENT DOCUMENTS

| | | | |
|---|---|---|---|
| 720,100 | 2/1903 | Bashlin | 137/515.7 |
| 1,388,602 | 8/1921 | Rotteleur | 137/512 X |
| 1,953,007 | 3/1934 | Farmer | 137/533.15 X |
| 2,394,272 | 2/1946 | Thiel | 137/533.17 X |
| 3,148,707 | 9/1964 | Smyklo | 137/539 X |
| 3,160,391 | 12/1964 | Medicus | 251/368 X |
| 3,489,171 | 1/1970 | Michael | 251/368 X |
| 3,770,001 | 11/1973 | Davis | 137/519.5 X |
| 4,094,337 | 6/1978 | Robinson | 251/368 X |
| 4,139,469 | 2/1979 | Rainin | 137/512 X |
| 4,197,875 | 4/1980 | Schieferstein | 137/533.11 |

*Primary Examiner*—Robert G. Nilson
*Attorney, Agent, or Firm*—S. A. Giarratana; E. T. Grimes; R. A. Hays

[57] ABSTRACT

Disclosed is a valve assembly having a housing defining a flow passage with an inlet port and a shoulder surrounding the port. The shoulder is chamfered in an upstream direction. A valve seat formed of a gold material, preferably 24 karet gold, is disposed on the shoulder. The margin of the seat about its central opening is deformed in an upstream direction against the chamfer. A sapphire ball seats against the deformed seat to seal the flow passage through the valve assembly.

5 Claims, 4 Drawing Figures

VALVE ASSEMBLY FOR PRESSURIZED FLUID SYSTEMS

BACKGROUND OF THE INVENTION

The present invention relates to a valve assembly for use in pressurized fluid systems and particularly relates to a check valve assembly for pumps used in liquid chromatography systems.

In liquid chromatography systems, reciprocating pumps are generally used to pump chromatographic solvents through a liquid chromatography column. A specific example of a pump, particularly a dual piston reciprocating pump assembly, useful for this purpose is described and illustrated in copending U.S. patent application Ser. No. 820,592 filed Aug. 1, 1977, now U.S. Pat. No. 4,173,437 of common assignee herewith. In pumping systems of that and other types, a retracting piston draws liquid into a vacated piston chamber through a pair of open check valves disposed in a liquid inlet passage to the chamber. A pair of check valves is also disposed in a liquid output conduit from the piston chamber. It will be appreciated that the pairs of inlet and outlet valves are normally in open and closed positions respectively in their respective conduits when the piston is vacating the piston chamber. When the piston is pumping, i.e., displaced into its chamber, the pairs of inlet and outlet valves are in closed and opened positions respectively. For further description of the aforementioned pump assembly used in a chromatographic system, reference is made to copending U.S. patent application Ser. No. 820,592 filed Aug. 1, 1977, now U.S. Pat. No. 4,173,437 of common assignee herewith, the disclosure of which application is incorporated herein by reference as though fully set forth herein.

It will also be appreciated that, in liquid chromatographic systems, a wide variety of liquids are pumped through the systems and these liquids are frequently highly corrosive in nature. For example, acetic acid and nitric acid are liquids often used in liquid chromatographic systems and these liquids are extremely corrosive. As a consequence, liquid chromatographic systems are manufactured using materials which are inert to most liquids passed through these systems.

Various materials have been proposed and utilized in constructing the valve assemblies for the pumps used in liquid chromatographic systems. For example, check valves utilizing synthetic sapphire balls and stainless steel valve seats have been manufactured and used. It has been observed, however, that the chamfer of the stainless steel valve seat, which cooperates with the sapphire ball to form the seal in the valve closed condition, frequently becomes spotted, pitted or dimpled in use. Also, substantial chips and cavities have been formed in these stainless steel valve seats. Under the substantial liquid pressures utilized in liquid chromatographic systems, on the order of 6000 psi, and because of these degradations to the valve seats, leaks deleterious to the operation of the systems have occurred. While the exact causes of the degradation of the stainless steel valve seats have not been identified with certainty, it is believed that metal fatigue under the constant seating and unseating action of the sapphire ball at high pressures as well as possible generation of an electrostatic field which could build up a static charge on the metal seat may cause the pitting and dimpling and the chipping respectively. Grit and dirt in the flowing liquid, as well as the corrosive effects of some of the solvents used in flowing systems, also cannot be ruled out as a source of the failure of the valve seats to form a liquid tight seal with the sapphire ball.

It is also known to utilize a synthetic sapphire ball in conjunction with an annular synthetic sapphire seat. Since sapphire is a non-conductive material, chipping which may be caused by the generation of an electrostatic charge on the conductive stainless steel seat, would be eliminated. However, a valve seat formed of synthetic sapphire material is highly brittle and prone to break. Also, it is extremely difficult to obtain a round opening in a sapphire valve seat and which opening will accurately and repeatedly seal with the mating sapphire ball. Thus, sapphire seats frequently do not seal with their mating balls as well as they theoretically should and further are subject to chipping if hard material is carried into the valve assembly by the liquid stream. Further, because synthetic sapphire is a brittle material, it cannot accept pressure without a resilient mounting between it and its housings. Thus, it is necessary to seal the sapphire seat to its surrounding housing, for example by using "O" rings. Consequently, use of sapphire seats as part of check valve assemblies in liquid chromatographic systems renders the system expensive and difficult to manufacture.

SUMMARY OF THE PRESENT INVENTION

Accordingly, it is a primary object of the present invention to provide a novel and improved valve assembly for use in a pressurized liquid flow system.

It is another object of the present invention to provide a novel and improved valve assembly for pressurized liquid flow systems which is chemically inert and consequently substantially free from attack by corrosive liquids.

It is still another object of the present invention to provide a novel and improved ball check valve assembly for pressurized liquid flow systems wherein the valve seat is automatically conformable in use to effect accurate and repeated sealing with its mating ball and particularly in the event the seat is pitted, scarred, dimpled, chipped or otherwised deformed in use.

It is still another object of the present invention to provide a novel and improved valve assembly for pressurized liquid flow systems wherein the valve is small in size and capable of handling liquid pressures on the order of 6000 psi.

It is a further object of the present invention to provide a novel and improved check valve assembly for pressurized liquid flow systems wherein repeatable leak tight liquid sealing is obtained at high pressures on the order of 6000 psi.

It is a still further object of the present invention to provide a novel and improved check valve assembly for use in flowing solvents to the liquid chromatographic column of a liquid chromatographic instrument and which valve assembly is inexpensive, relatively easy to manufacture and assemble, inert to corrosive liquids, leak tight and which has a malleable valve seat for accurate leak tight conformance with the surface of its mating ball.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the present invention, as embodied and broadly described herein, a valve assembly constructed in accordance with the present invention for use in pressurized liquid flow systems comprises a housing including a support defining a flow passage having an inlet port and a shoulder surrounding the port, the shoulder having a generally annular chamfered surface extending therefrom in a upstream direction, a valve seat disposed on the shoulder and having a central opening in registry with the inlet port, the valve seat being formed of a material containing at least 50% by weight pure gold, the housing defining a chamber on the side of the seat opposite the flow passage through the support, a ball disposed in the chamber and formed of a material harder than the material forming the seat, the margin of the seat about its central opening being deformed in a upstream direction against the chamfer to form a generally annular seat for the ball for sealing the chamber and the flow passage one from the other when the ball engages the seat.

It will be appreciated from the foregoing that the valve seat formed utilizing gold as a constituent material, preferably pure or 24 karat gold, satisfies the conditions of inertness to the corrosive chemicals commonly flowed through liquid chromatographic systems and malleability. While pure gold is the preferred material for forming the valve seat, gold alloyed with other metals satisfying these conditions of chemical inertness and malleability may also be utilized. For example, alloys of gold and lead or silver, may be utilized with the gold constituting at least 50% by weight of the total material.

The malleability and chemical inertness of gold renders it a particularly useful material from which the seat may be formed. Particularly, the valve seat formed of gold material is sufficiently malleable to conform to the portion of the ball bearing against the seat to form an accurate and repeatable leak tight seal therewith. The use of gold as at least 50% of the constituent seat material is also advantageous in that gold does not substantially harden with working. Further, deformation of the seat due to the action of hard substances contained in the liquid flowing through the valve and impinging against the seat can be corrected through continued use of the check valve at its operating pressures. A seat deformed in this manner is returned to its proper shape at the operating pressure of the system to again achieve accurate and repeatable leak tight sealing. Foreign substances clinging to the seat, if not washed away under operating conditions, will be driven into the seat and the surface of the seat will be reformed with use to conform to the shape of the ball with consequent accurate and repeated sealing.

Furthermore, the present valve assembly is relatively inexpensive to manufacture and is more readily and easily manufactured in comparison with the manufacture of check valve assemblies in chromatographic systems using stainless steel or sapphire seats. Particularly, the ball is pressed against the gold seat upon initial assembly of these elements in the check valve, the chamfer sealing surface of the seat being initially deformed. Subsequently, the check valve assembly is subjected to pressures approximating its normal operating pressure, e.g. 6000 psi. Thus, the sapphire ball finally deforms the seat to its intended shape whereby subsequent accurate sealing of the liquid passage is obtained. Also, the cost of materials for the present valve assembly compares favorably with the cost of materials used in check valves previously disposed in liquid chromatographic systems.

The invention consists in the novel parts, constructions, arrangements, combinations, and improvements shown and described. The accompanying drawings which are incorporated in and constitute a part of the specification, illustrate one embodiment of the invention and, together with the description, serve to explain the principles of the invention.

BRIEF DESCRIPTION OF THE DRAWING FIGURES

DESCRIPTION OF A PREFERRED EMBODIMENT

Reference will now be made in detail to the present preferred embodiment of the invention, an example of which is illustrated in the accompanying drawings.

Figure 1:
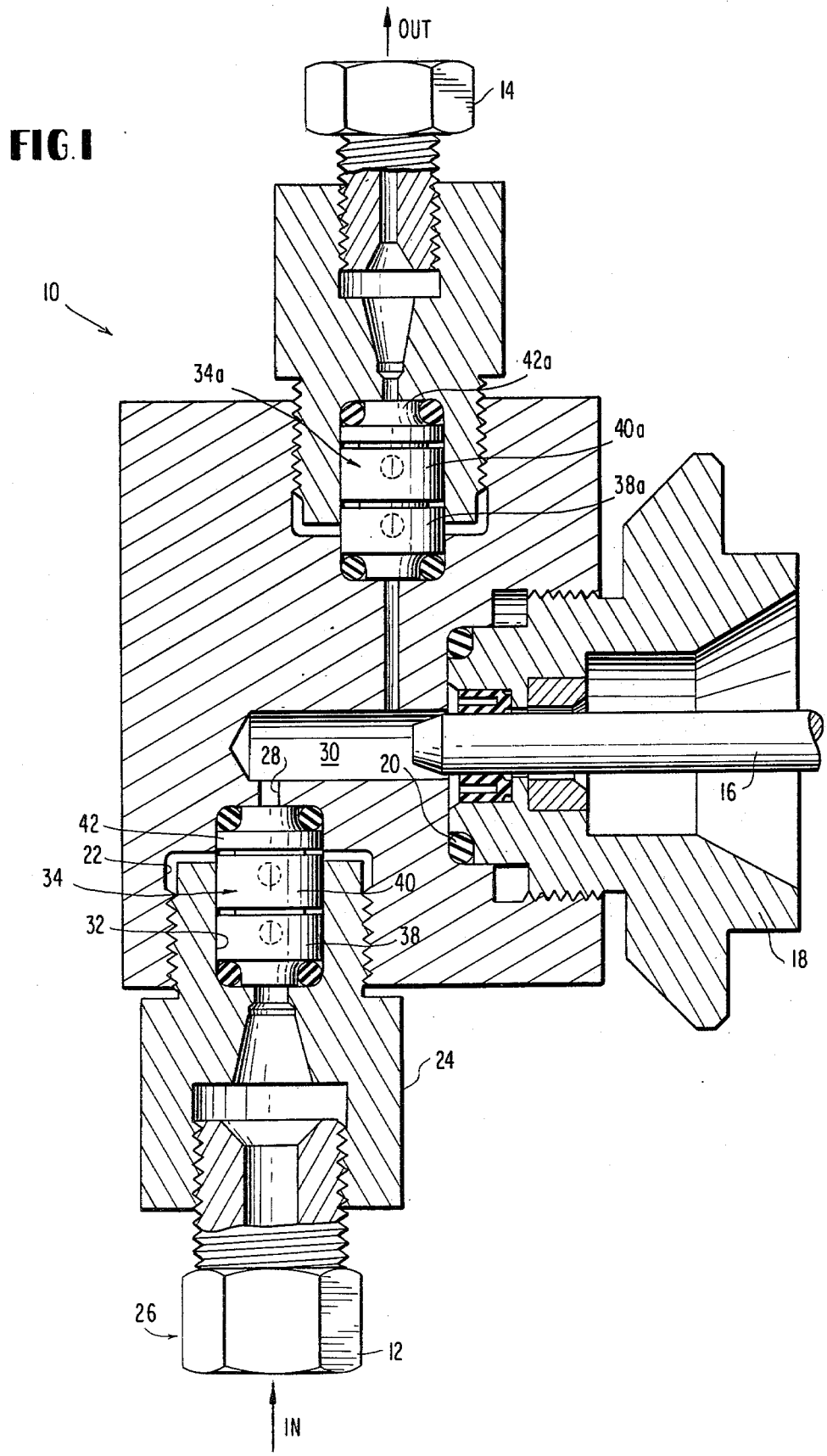
FIG. 1 is a vertical cross-sectional view illustrating a cylinder head useful in a liquid chromatographic instrument with inlet and outlet valve assemblies constructed in accordance with the present invention.

Referring now to FIG. 1, there is illustrated a cylinder head, generally designated 10, having inlet and outlet ports 12 and 14 and which head forms a part of a dual piston reciprocating pump assembly for use in a liquid chromatographic system, as described in detail in the above-referenced copending U.S. patent application. For present purposes, it is believed sufficient to note that the pump assembly disclosed in that application comprises a pair of pumps including axially aligned pistons operating in an outof-phase relation one to the other and with respect to the inlet and outlet ports 12 and 14 of respective cylinder heads 10 to provide a substantially continuous flow to a conduit, not shown, common to outlet ports 14. One of the pistons of the pump assembly is illustrated in FIG. 1 and designated 16. Piston 16 is preferably formed of a sapphire material and reciprocates in a stainless steel seal holder 18 suitably secured to head 10 and sealed thereto by "O" ring 20. Details of seal holder 18 and the seals carried thereby are disclosed in the above-mentioned copending Patent Application.

Cylinder head 10 is provided with an inlet bore 22 for threadedly receiving a dual inlet check valve fitting 24. Check valve fitting 24 is adapted to receive a conventional end connection 26 of a pump inlet tube, not shown. Inlet bore 22 communicates with an inlet passage 28 which extends from the outer end of piston cylinder 30 in head 10 to the bottom of bore 22. The inner end of check valve fitting 24 is provided with a recess 32 for receiving a portion of a dual inlet valve assembly constructed in accordance with the present invention and generally designated 34.

Figure 2A:
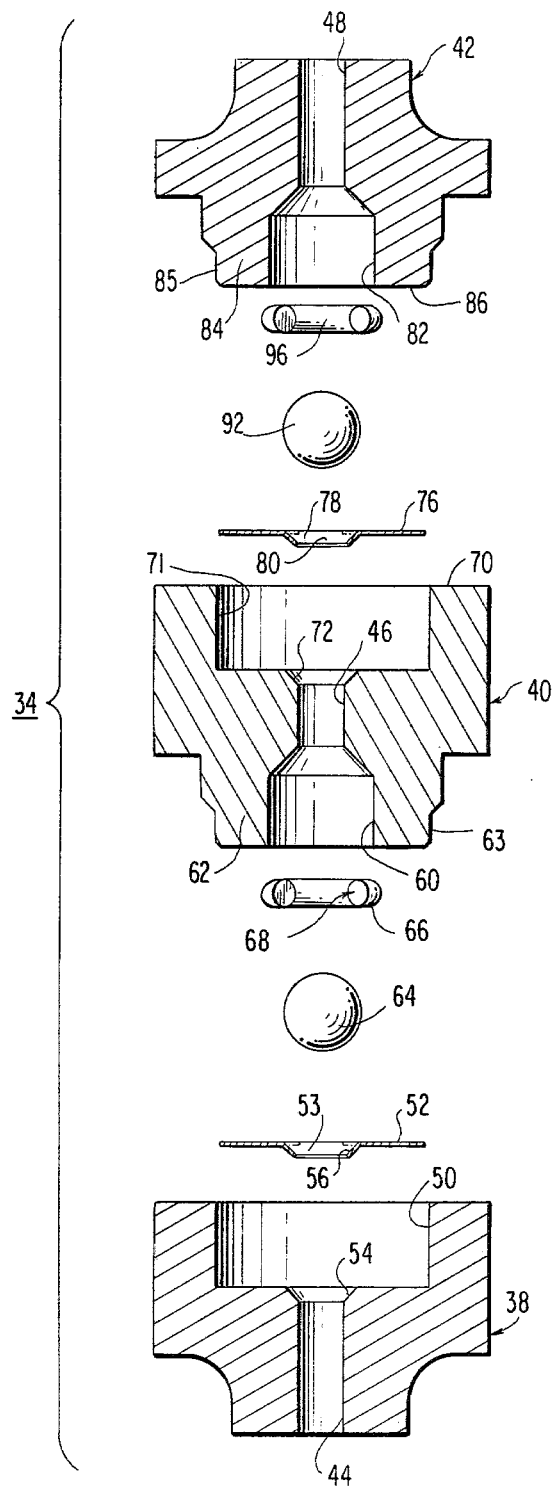
FIG. 2A is a view similar to FIG. 2 with the parts thereof in exploded juxtaposition.
Figure 2:
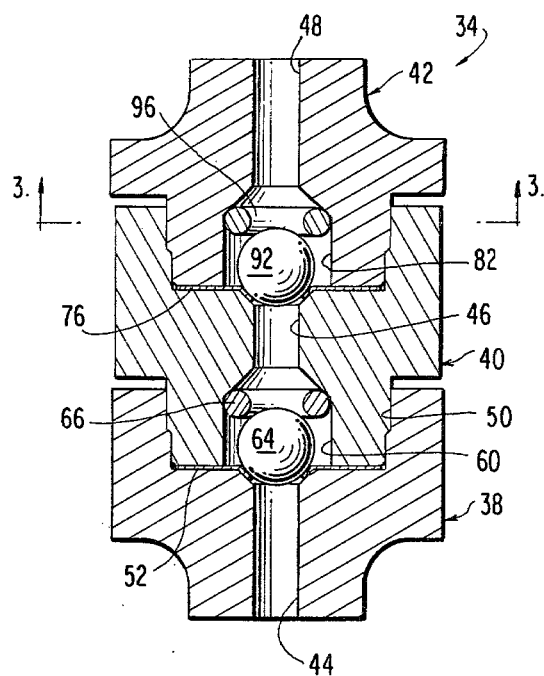
FIG. 2 is an enlarged cross-sectional view of one of the pair of valve assemblies.
Figure 3:
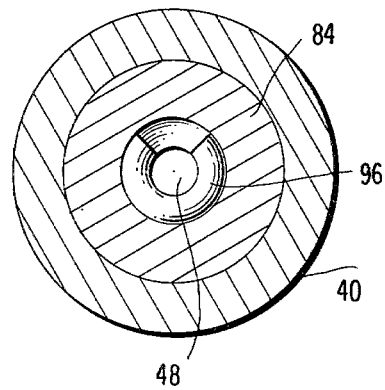
FIG. 3 is a cross-sectional view thereof taking generally about on line 3—3 in FIG. 2.

Referring now particularly to FIG. 2, the dual inlet valve assembly 34 includes a housing comprised of a base member 38, an intermediate member 40, and an end member 42. The base, intermediate and end members are generally cylindrical and have axially extending bores 44, 46 and 48 extending therethrough respectively. On the downstream face of base member 38, there is provided a cylindrical recess 50 coaxial with inlet bore 44 and recess 50 receives an annular valve seat 52. Valve seat 52 has a central opening 53 in axial alignment with inlet bore 44. For reasons which will be apparent from the ensuing description, the end face of recess 50 about bore 44 is provided with chamfer 54, preferably a 45 degree linear surface. As illustrated, the margin 56 of seat 52 about the central opening 53 is deformed over chamfer 54 and in an upstream direction.

Intermediate member 40 has a chamber 60 in axial alignment with and in opposition to recess 50 of base member 38. Chamber 60 constitutes a bore larger in diameter than bore 46 and which is defined in part, by an annular boss 62 which extends into recess 50 to bear and seal against annular seat 52. The outer margin of boss 62 is recessed adjacent its lip at 63 to provide a guide for an interference fit between intermediate member 40 and base member 38 when assembled. Disposed within chamber 60 and on the opposite side of seat 52 from inlet port 44 is a ball 64, preferably formed of a synthetic sapphire material. At the base of chamber 60 is an abutment wire or spring 66 against which ball 64 abuts when liquid flows through the check valve assembly in the direction indicated by the arrows. The abutment member 66 preferably comprises a portion of a spring which extends in a circular direction approximately two thirds of a full circle leaving a gap 68 through which fluid may flow when ball 64 abuts wire 66. The opposite ends of wire 66 are spring biased away from one another and consequently the wire 66 is secured within chamber 60 by a friction fit.

The opposite end face 70 of intermediate member 40 has a recess 71 coaxial with bore 46. A chamfer 72 is provided about bore 46 at its opening into recess 71. Chamfer 72 is similarly configured as chamfer 54. Cylindrical recess 71 receives an annular valve seat 76 having a central opening 78 in alignment with bore 46. As illustrated, the margin 80 of seat 76 about central opening 78 is deformed over chamfer 72 and in an upstream direction.

End member 42 includes a chamber 82 in axial alignment with the chamber 71 of intermediate member 40. Chamber 82 constitutes a bore larger in diameter than bore 48 and which is defined in part, by an annular boss 84 which is received within chamber 71 of intermediate member 40. The outer margin of boss 84 is recessed adjacent its lip at 85 to provide a guide for an interference fit between intermediate member 40 of end member 42. When assembled, shoulder 86 defined by the end face of boss 84 bears against annular valve seat 76 disposed in recess 71. A ball 92 similar to the ball 64 in chamber 60 is disposed in chamber 82 for sealing engagement with the deformed margin 80 of seat 76. A wire 96 similar to the wire or abutment number 66 is disposed in the end of chamber 84 opposite valve seat 76.

The dual outlet check valve assembly 34a is formed identically to the dual inlet check valve assembly 34 previously described and like reference numerals as in dual inlet check valve assembly are applied to like parts in the dual outlet check valve assembly 34a followed by the letter notation "a".

It is a particular feature of the present invention, that the valve seat for each of the check valves of each dual check valve assembly is formed of a gold material. Preferably, the annular seat is formed of pure gold, i.e., 24 karat gold. It will be appreciated that gold is selected as the material because it is inert to chemicals and because of its malleability which enables the seat to conform and seal accurately and repeatedly with the ball of the ball check assembly. The ball is, of course, formed of a harder material, e.g., synthetic sapphire, than the material forming the valve seat. However, the annular valve seat may be formed of gold alloyed with another material which has properties similar to those of gold, e.g., chemically inert and malleable. Thus, gold alloyed with lead or silver may be utilized as the material for the annular valve seats. In the event gold is alloyed with another material, it should constitute at least 50% by weight of the constituent material of the valve seat in order to retain the desired characteristics of a valve seat useful for a check valve assembly in liquid chromatographic instruments.

Further, gold, either pure or as a constituent material of a valve seat formed of at least 50% by weight of gold, is particularly suitable for use in the valve seat in check valve assemblies in liquid chromatographic instruments because it is self supporting and seals against contiguous surfaces. It will be recalled that synthetic sapphire valve seats require resilient "O" rings for mounting the seat in and sealing about the seat within the valve housing. Because of the malleability of the valve seat formed in accordance in the present invention, it can be readily disposed in the valve assembly directly against its housing without a resilient mount and will also form a leak tight seal with its surrounding housing without the necessity of a separate seal, such as an "O" ring. Thus, in assembling the valve assembly hereof, the annular bosses 63 and 84 of the intermediate and end members 40 and 42 respectively are received in and their end faces are pressed against the valve seats 52 and 76 in the corresponding recesses 50 and 71 of the base and intermediate members. This pressing action deforms the valve seats against the end faces of the bosses and the bottom faces of the underlying chambers to form seals therewith. Thus, liquid flow about the valve seals is prevented.

Also, in assembling the valve assemblies hereof, the sapphire balls are initially pressed against the flat valve seats to deform the margins thereof about their central openings and over the underlying chamfers. This deforms the margins of the seats against the chamfers and shapes each margin into mating conformance with the surface of the corresponding ball. After the base, intermediate and end members are assembled, the valve assembly is subjected to a liquid pressure, e.g. 6000 psi corresponding to the average pressure to be encountered in use in the liquid chromatographic instrument. This pressure finally seats each ball against its valve seat and shapes the latter to form a leak tight seal therewith. Because the material of the valve seat is malleable, any dirt or grit carried by the liquid flowing through the system will, under the system pressure, work into the valve seat and eventually a smooth valve sealing surface will be reformed.

In a specific preferred embodiment of the present invention, the valve seal is formed of 24 karat gold and has outer and inner diameters of 0.194 and 0.040 inches, respectively. The thickness of the seat is preferably 0.005 inch. The diameter of the bores 44, 46 and 48 preferably corresponds to the diameter of the central opening through the valve seats, i.e., 0.040 inches. The chamfers underlying the valve seats are preferably formed at 45 degrees and extend linearly although it will be appreciated that other angles of the chamfer could be utilized. Also, the term chamfer as used herein also includes annular arcuate or curved surfaces. The chamfer underlying the valve seats therefore need not necessarily be linear but could be rounded. Thus, the inner margin of each valve seat could be deformed about a rounded rather than linear surface.

It will be apparent to those skilled in the art that various modifications and variations can be made in the valve assemblies of the present invention without departing from the scope or spirit of the invention.

What I claim is:

1. A ball valve assembly for use in a liquid chromatography system where said liquid of said system contains particulate matter; said assembly comprising:

a housing defining a flow passage including a port and a shoulder downstream of and surrounding said port, said shoulder having a generally chamfered surface extending upstream therefrom, said housing further defining a chamber on the downstream side of said port;

a ball disposed in said chamber;

means for continuously self-sealing the interface between said chamfered surface of said shoulder and said ball and for preventing particulate matter remaining on said interface from entering subsequent flow streams, said means including a valve seat member disposed on said shoulder and having a central opening in registry with said inlet port, said valve seat member being formed of a material containing at least 50% pure gold;

a member, constituting part of said housing, further defining said chamber and having a face engaging said seat on the side thereof opposite said shoulder to retain said seat against said shoulder whereby a seal is formed between said face of said member and said shoulder for preventing communication between said chamber and said port externally about said seat.

2. An assembly according to claim 1 wherein the latter seal is formed directly between said member and said seat.

3. Assembly according to claim 1 wherein the latter seal is formed directly between said seat and said shoulder.

4. A ball valve assembly for use in a liquid chromatography system where said liquid of said system contains particulate matter; said assembly comprising:

a housing defining a flow passage including a port and a shoulder downstream of and surrounding said port, said shoulder having a generally chamfered surface extending upstream therefrom, said housing further defining a chamber on the downstream side of said port;

a ball disposed in said chamber; and means for continuously self-sealing the interface between said chamfered surface of said shoulder and said ball and for preventing particulate matter remaining on said interface from entering subsequent flow streams, said means including a valve seat member disposed on said shoulder and having central opening in registry with said inlet port; said valve seat being formed of gold alloyed with a material which renders the seat no more than 20% harder than the hardness of a seat formed of 24 karat gold, said alloy containing at least 50% pure gold.

5. A ball valve assembly for use in a liquid chromatography system where said liquid of said system contains particulate matter; said assembly comprising:

a housing defining a flow passage including a port and a shoulder downstream of and surrounding said port, said shoulder having a generally chamfered surface extending upstream therefrom, said housing further defining a chamber on the downstream side of said port;

a ball disposed in said chamber; and means for continuously self-sealing the interface between said chamfered surface of said shoulder and said ball and for preventing particulate matter remaining on said interface from entering subsequent flow streams, said means including a valve seat member disposed on said shoulder and having a central opening in registry with said inlet port; said valve seat being formed with gold alloyed with a material which is at least as chemically inert as pure gold, said alloy containing at least 50% pure gold.

* * * * *